(12) United States Patent
Di Mattia et al.

(10) Patent No.: US 9,774,923 B2
(45) Date of Patent: Sep. 26, 2017

(54) BANDWIDTH MANAGEMENT AND ADVERTISEMENT INSERTION IN MEDIA CONTENT DELIVERY SYSTEMS AND METHODS

(75) Inventors: James F. Di Mattia, Churchville, MD (US); Michael P. Ruffini, Methuen, MA (US); Harpal S. Bassali, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1358 days.

(21) Appl. No.: 12/790,178

(22) Filed: May 28, 2010

(65) Prior Publication Data

US 2011/0296458 A1 Dec. 1, 2011

(51) Int. Cl.
| | |
|---|---|
| *H04N 21/23* | (2011.01) |
| *H04N 21/81* | (2011.01) |
| *H04N 21/2365* | (2011.01) |
| *H04N 21/44* | (2011.01) |
| *H04N 21/234* | (2011.01) |

(52) U.S. Cl.
CPC ..... *H04N 21/812* (2013.01); *H04N 21/23424* (2013.01); *H04N 21/23655* (2013.01); *H04N 21/44008* (2013.01); *H04N 21/44016* (2013.01)

(58) Field of Classification Search
None
See application file for complete search history.

(56) References Cited

U.S. PATENT DOCUMENTS

| | | | | |
|---|---|---|---|---|
| 5,805,974 A | * | 9/1998 | Hite et al. | 725/69 |
| 5,966,120 A | * | 10/1999 | Arazi | H04N 21/23424 |
| | | | | 725/117 |
| 6,795,506 B1 | * | 9/2004 | Zhang | H04L 29/06027 |
| | | | | 348/390.1 |
| 7,146,627 B1 | * | 12/2006 | Ismail et al. | 725/47 |
| 7,266,832 B2 | * | 9/2007 | Miller | 725/34 |
| 7,394,850 B1 | | 7/2008 | Gordon | |
| 2001/0004767 A1 | * | 6/2001 | Gordon et al. | 725/87 |
| 2001/0038610 A1 | * | 11/2001 | Decker | H04L 12/6418 |
| | | | | 370/230 |
| 2002/0184314 A1 | * | 12/2002 | Riise | 725/32 |
| 2004/0025181 A1 | * | 2/2004 | Addington et al. | 725/89 |
| 2005/0166224 A1 | * | 7/2005 | Ficco | 725/35 |
| 2005/0193410 A1 | * | 9/2005 | Eldering | 725/34 |

(Continued)

*Primary Examiner* — Cai Chen

(57) ABSTRACT

An exemplary method includes a media content delivery system transmitting a transport stream containing an advertisement channel and a program channel, the program channel carrying a media program stream at a first bit rate, detecting an upcoming advertisement break within the media program stream, inserting, in response to the detecting of the upcoming advertisement break, an advertisement content stream having a second bit rate that is lower than the first bit rate into the program channel to temporally coincide with the advertisement break to free bandwidth in the transport stream during the advertisement break, and inserting an additional advertisement content stream in the advertisement channel, the additional advertisement content stream temporally coinciding with the advertisement break and utilizing at least a portion of the freed bandwidth in the transport stream. Corresponding methods and systems are also disclosed.

16 Claims, 14 Drawing Sheets

(56) References Cited

U.S. PATENT DOCUMENTS

| | | |
|---|---|---|
| 2006/0130121 A1* | 6/2006 | Candelore ........ H04N 21/23439 725/145 |
| 2006/0171423 A1 | 8/2006 | Helms et al. |
| 2007/0157231 A1* | 7/2007 | Eldering ................ G06Q 30/02 725/35 |
| 2008/0034386 A1* | 2/2008 | Cherry et al. .................. 725/35 |
| 2009/0150930 A1 | 6/2009 | Sherwin et al. |
| 2012/0192224 A1* | 7/2012 | Eldering et al. ................ 725/32 |

* cited by examiner

BANDWIDTH MANAGEMENT AND ADVERTISEMENT INSERTION IN MEDIA CONTENT DELIVERY SYSTEMS AND METHODS

BACKGROUND INFORMATION

The advent of set-top-box devices and other media content access devices ("access devices") has provided users with access to a large number and variety of media content choices. For example, a user may choose to experience a variety of broadcast television programs, pay-per-view services, video-on-demand programming, Internet services, and audio programming via a set-top-box device.

Such access devices have also provided service providers (e.g., television service providers) with an ability to present targeted advertising to specific users or groups of users. For example, designated advertisement channels may be used to deliver various targeted advertisements to an access device associated with a particular user. The access device may switch from being tuned to a program channel carrying a media content program to being tuned to one of the advertisement channels during an advertisement break in the media content program in order to present advertisement content carried by the advertisement channel to the user. After the advertisement content has been presented, the access device may tune back to the program channel.

However, each designated advertisement channel uses valuable bandwidth that could otherwise be allocated to program channels for use in distributing additional media content programs. Accordingly, due to the finite nature of bandwidth, conventional use of designated advertisement channels to carry targeted advertisements to access devices reduces the quantity and/or variety of media content programs that can be offered to users of a media service provided by a service provider.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
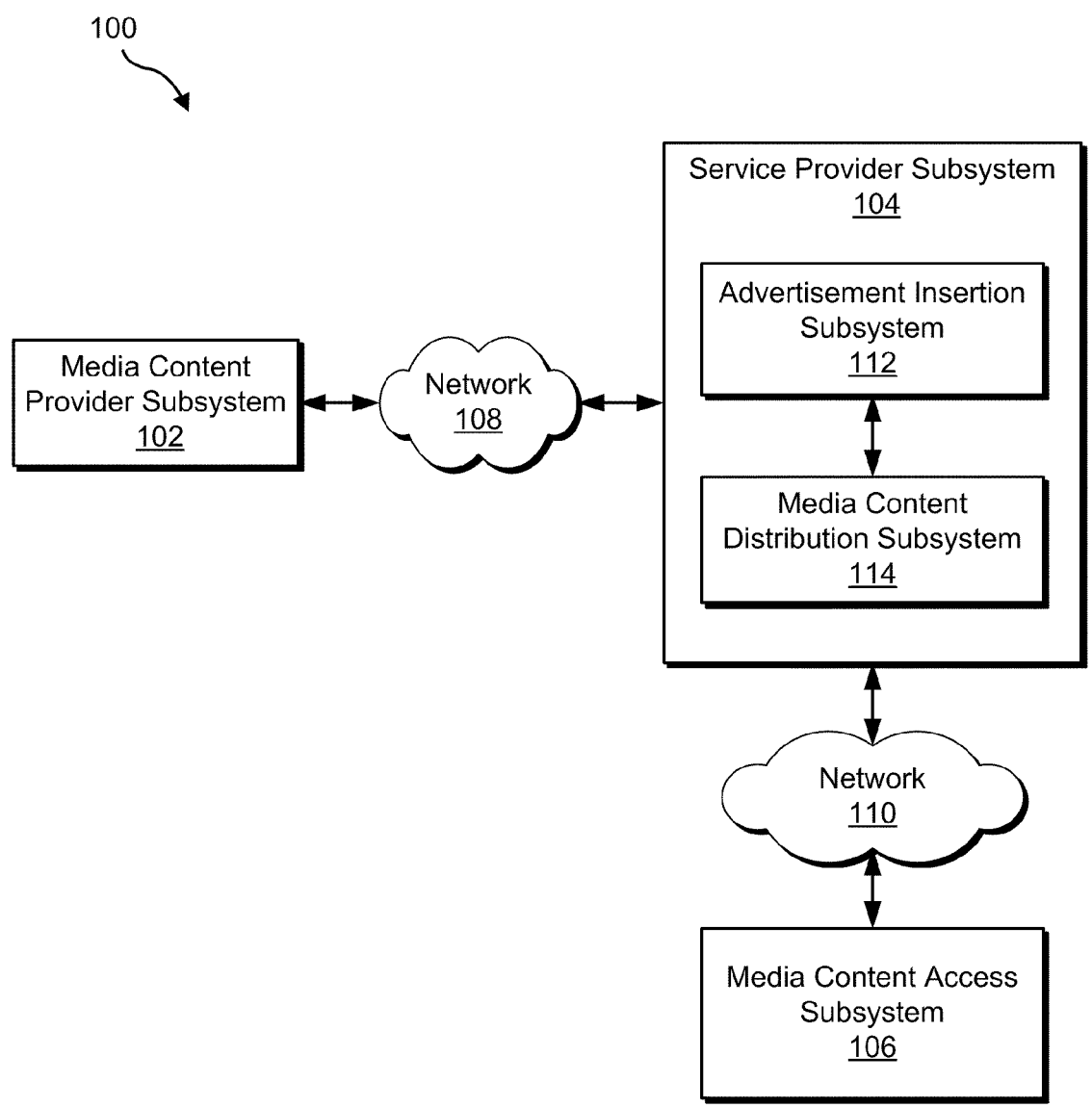
FIG. 1 illustrates an exemplary media content delivery system according to principles described herein.

Exemplary media content delivery systems and methods are disclosed. The exemplary systems and methods described herein provide for bandwidth management and advertisement insertion associated with delivery of media content. For example, the exemplary systems and methods may manage allocation of bandwidth in a media content transport stream to facilitate insertion of one or more advertisements in the media content transport stream. The bandwidth management processes described herein may allow more advertisements to be delivered to users (e.g., inserted in a media content transport stream that is transmitted to one or more media content access devices) than would otherwise be supported by conventional techniques, without reducing the quantity or variety of media program content that can be delivered to users.

The systems and methods described herein may facilitate delivery of targeted advertisements to users. For example, by increasing the number of advertisements that can be carried by a media content transport stream, a greater variety of targeted advertisements may be delivered to a media content access device, which may select, from the advertisements, an advertisement that is determined to be best targeted to a user of the access device. This may be accomplished without adversely impacting the quantity and/or variety of media program content that can be made available to the user by a service provider.

As used herein, the term "media content" may refer generally to any content made accessible by a media content delivery system. Media content may include, but is not limited to, any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user.

As used herein, the term "media program content" or simply "program content" may refer to media content that is provided by a media content provider subsystem to a service provider subsystem for distribution by the service provider subsystem to one or more end users. For example, program content may include media content provided by a content source (e.g., a content provider such as ESPN) to a service provider (e.g., a television service provider) for distribution to one or more users (e.g., one or more subscribers to a television service). As used herein, the term "advertisement content" may refer to media content in the form of one or more advertisements that are or may be inserted by a service provider subsystem into media content streams for distribution to one or more users. In addition, as used herein, a "media content stream" may refer to any data stream carrying data representative of media content, a "media program stream" or "program stream" may refer to any data stream carrying data representative of program content, and an "advertisement stream" may refer to any data stream designated for carrying data representative of advertisement data.

Exemplary media content delivery systems and methods will now be described with reference to the drawings.

FIG. 1 illustrates an exemplary media content delivery system 100 (or simply "system 100"). System 100 may include a media content provider subsystem 102, a service provider subsystem 104, and a media content access subsystem 106 (or simply "access subsystem 106"). Media content provider subsystem 102 and service provider subsystem 104 may be configured to communicate with one another by way of network 108. Service provider subsystem 104 and access subsystem 106 may be configured to communicate with one another by way of network 110. As will be described in more detail below, service provider subsystem 104 may facilitate delivery of media content provided by media content provider subsystem 102 to access subsystem 106.

Media content provider subsystem 102, service provider subsystem 104, and access subsystem 106 may communicate using any suitable communication technologies, devices, networks, media, and protocols supportive of remote data communications. For example, media content provider subsystem 102 and service provider subsystem 104 may communicate over network 108 and service provider subsystem 104 and access subsystem 106 may communicate over network 110 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), in-band and out-of-band signaling technologies, and other suitable communications technologies.

Networks 108 and 110 may each include one or more networks or types of networks (and communication links thereto) capable of carrying communications, media content, and/or data signals between media content provider subsystem 102, service provider subsystem 104, and access subsystem 106. For example, networks 108 and 110 may each include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between media content provider subsystem 102, service provider subsystem 104, and access subsystem 106. Communications between media content provider subsystem 102, service provider subsystem 104, and access subsystem 106 may be transported using any one of above-listed networks, or any combination or sub-combination of the above-listed networks.

As shown in FIG. 1, service provider subsystem 104 may include an advertisement insertion subsystem 112 and a media content distribution subsystem 114 (or simply "distribution subsystem 114") communicatively coupled to one another. Advertisement insertion subsystem 112 and distribution subsystem 114 may be configured to facilitate dynamic management of bandwidth and insertion of advertisement content (e.g., one or more advertisements such as targeted advertisements) into one or more media content streams for transmission to access subsystem 106. In this manner, as will be described in more detail below, advertisement content provided by service provider subsystem 104 may be delivered to access subsystem 106 for selection and presentation to a user of access subsystem 106.

Figure 2:
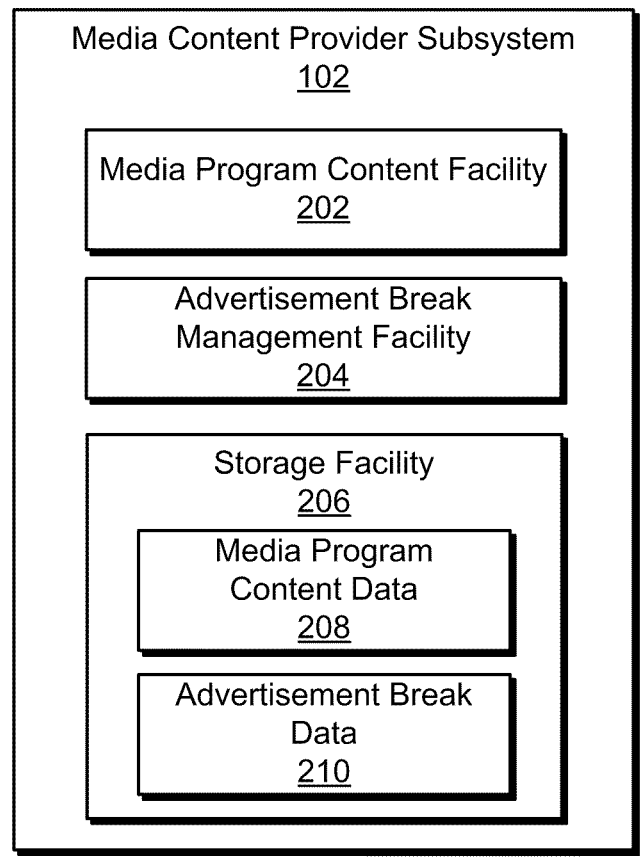
FIG. 2 illustrates exemplary components of a media content provider subsystem according to principles described herein.

FIG. 2 illustrates exemplary components of media content provider subsystem 102. As shown, media content provider subsystem 102 may include a media program content facility 202, an advertisement break management facility 202, and a storage facility 206, which may be in communication with one another using any suitable communication technologies.

Media program content facility 202 may be configured to manage (e.g., maintain, generate, process, and/or transmit) media program content configured to be provided to service provider subsystem 104 for distribution and presentation to one or more users of access subsystem 106. For example, media program content facility 202 may be configured to maintain and transmit data representative of media program content in the form of a media content stream to service provider subsystem 104. Service provider subsystem 104 may receive and distribute the media content stream containing the media program content to access subsystem 106 as described herein.

Advertisement break management facility 204 may be configured to manage placement of one or more advertisement breaks in a media content stream provided to service provider subsystem 104. An advertisement break, as used herein, may refer to an interval (i.e., an advertisement break interval) within media program content and/or a media program stream carrying the media program content that is designated by advertisement break management facility 204 as being reserved for insertion of advertisement content by service provider subsystem 104. With an advertisement break designated by advertisement brake management facility 204, a content provider operating media content provider subsystem 102 typically expects that service provider subsystem 104 will insert advertisement content into the advertisement break. The insertion of advertisement content into the advertisement break by service provider subsystem 104 may overwrite any media program content originally included within the advertisement break by media content provider subsystem 102 (e.g., one or more advertisements inserted in the advertisement break by media program content facility 202).

In some examples, advertisement break management facility 204 may be configured to insert a message (e.g., an in-band message) indicative of an upcoming advertisement break in a media content stream provided by media program content facility 202. Accordingly, as will be described in more detail below, service provider subsystem 104 may use the message to detect an upcoming advertisement break in a media content stream. The message may be indicative of a start of the advertisement break, an end of the advertisement break, a duration of the advertisement break, a type of advertisement break (e.g., whether the advertisement break is reserved for service provider subsystem 104 to insert advertisement content), and/or any other information associated with the advertisement break as may serve a particular implementation.

Storage facility 206 may be configured to maintain media program content data 208 representative of media program content managed by media program content facility 202 and advertisement break data 210 generated and/or utilized by advertisement break management facility 204. It will be recognized that storage facility 206 may maintain additional or alternative data as may serve a particular implementation.

Figure 3:
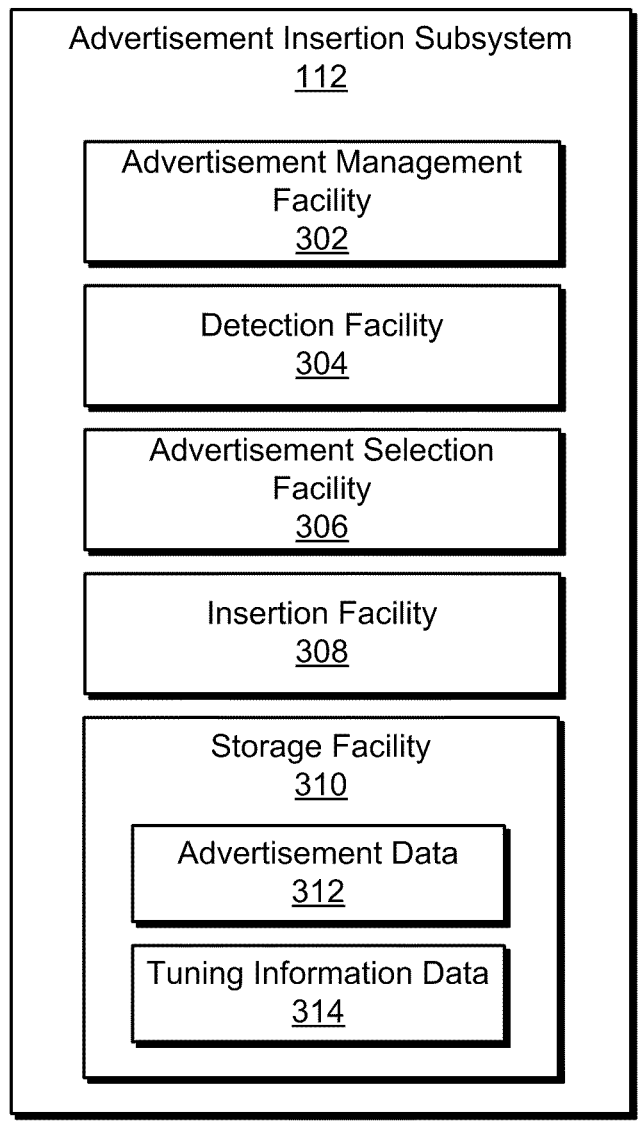
FIG. 3 illustrates exemplary components of an advertisement insertion subsystem according to principles described herein.

FIG. 3 illustrates exemplary components of advertisement insertion subsystem 112. As shown, advertisement insertion subsystem 112 may include an advertisement management facility 302, a detection facility 304, an advertisement selection facility 306, an insertion facility 308, and a storage facility 310, which may be in communication with one another using any suitable communication technologies.

Advertisement management facility 302 may be configured to manage (e.g., generate, process, maintain, etc.) advertisement content such as a plurality of advertisements that may be dynamically inserted into media content streams for delivery and presentation to a user of access facility 106. For example, advertisement management facility 302 may be configured to maintain data representative of a plurality of advertisements having various characteristics such as various durations, bit rates, and/or resolutions. To illustrate, one or more of the advertisements may have high resolutions such as high definition ("HD") resolutions (e.g., 480p, 720p, 1080i, 1080p, etc.) or standard definition ("SD") resolutions (e.g., 480i) and low bit rates (e.g., bit rates that are lower than bit rates traditionally used to transport HD or SD resolution media content). As described in more detail further below, low bit rate advertisements may be used to increase the number of advertisements that may be provided by service provider subsystem 104 to access subsystem 106. It will be recognized that advertisement management facility 302 may be configured to maintain advertisements having additional or alternative resolutions and/or bit rates as may serve a particular implementation.

In some examples, the advertisements maintained by advertisement management facility 302 may include targeted advertisements. As will be described in more detail below, in certain embodiments, access subsystem 106 may be configured to select one or more of the targeted advertisements for presentation to a user in accordance with a targeted advertisement selection heuristic.

Detection facility 304 may be configured to detect an upcoming advertisement break in a media content stream, such as a media content stream being transmitted by service provider subsystem 104 to access subsystem 106. Detection facility 304 may detect the upcoming advertisement break in any suitable manner as may serve a particular implementation. For example, detection facility 304 may be configured to detect a message indicative of an upcoming advertisement break in a media content stream. As mentioned, the message may have been inserted into the media content stream by advertisement break management facility 204 of media content provider subsystem 102. Detection facility 304 may process data included in the message in order to determine a time of occurrence (e.g., a start time and duration) of an advertisement break in the media content stream.

Detection facility 304 may be further configured to detect a resolution and/or a bit rate of media program content carried in the media content stream. Detection facility 304 may detect the resolution and/or the bit rate of the media program content in any suitable manner as may serve a particular implementation. For example, detection facility 304 may analyze data included in a media content stream being transmitted to access subsystem 106 and determine the resolution and/or bit rate of the media program content based on the analysis. As another example, detection facility 304 may access metadata for the media program content and determine from the metadata the resolution and/or bit rate of the media program content.

Advertisement selection facility 306 may be configured to select, from the advertisement content maintained by advertisement management facility 302, advertisement content to be inserted into a media content stream. For example, in response to a detection of an upcoming advertisement break in a media content stream, advertisement selection facility 306 may select advertisement content to be inserted into the advertisement break in the media content stream.

Advertisement selection facility 306 may be configured to select the advertisement content to be inserted based on a predefined advertisement content selection heuristic, which, in certain embodiments, may be configured to optimize utilization of bandwidth for insertion of advertisement content in the media content stream. For example, advertisement selection facility 306 may be configured to base a selection of advertisement content on one or more bit rates, including, for example a bit rate of media program content associated with the advertisement break and one or more bit rates of advertisement content. Additionally or alternatively, advertisement selection facility 306 may be configured to base a selection of advertisement content on media content resolution, including, for example, a resolution of media program content associated with the advertisement break and one or more resolutions of advertisement content.

To illustrate, a detected upcoming advertisement break may be associated with media program content having a particular bit rate. For example, the advertisement break may be positioned within HD media program content having a bit rate of approximately seventeen megabits per second ("Mbps"). Conventionally, advertisement content that has a matching resolution and that is suitable for transmission at a matching bit rate would be inserted linearly into the advertisement break. Instead of selecting advertisement content having a matching resolution and bit rate in accordance with conventional techniques, advertisement selection facility 306 may be configured to select advertisement content that is suitable for transmission at a bit rate that is lower than the bit rate at which the media program content is transmitted. For example, instead of selecting advertisement content for transmission at approximately seventeen Mbps, advertisement selection facility 306 may select advertisement content for transmission at a bit rate that is lower than seventeen Mbps. For instance, advertisement content may be selected for transmission at approximately seven Mbps.

To assist with such a selection of advertisement content, advertisement management facility 302 may maintain data representative of bit rate boundaries of the advertisement content. To illustrate, for a particular advertisement, advertisement management facility 302 may maintain data indicating a low bit rate boundary for the advertisement. The low bit rate boundary may indicate a bit rate at which presentation of the advertisement may become unacceptably degraded. Accordingly, advertisement selection facility 306 may select advertisement content for transmission at lower bit rates that have been deemed to produce acceptable user viewing experiences.

As described in more detail further below, by selecting advertisement content for transmission at lower bit rates than the bit rate at which the associated media program content is transmitted, bandwidth within a media content stream may be freed. For example, where advertisement content is transmitted at seven Mbps during an advertisement break within a media content stream in which media program content is transmitted at seventeen Mbps, approximately ten Mbps of bandwidth is freed and may be used to transmit additional media content (e.g., additional advertisement content) during the advertisement break.

Advertisement selection facility 306 may be configured to select additional advertisement content to be used to fill at least a portion of the freed bandwidth. For example, advertisement selection facility 306 may select advertisement content to be transmitted during the advertisement break interval at a total bit rate that is no greater than the bit rate of the freed bandwidth (e.g., no more than ten Mbps in the present example).

Figure 4:
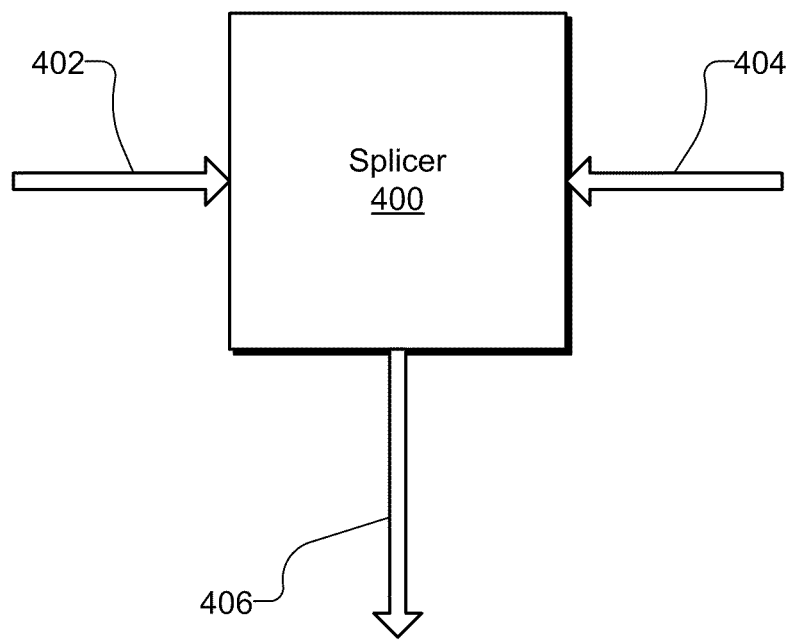
FIG. 4 illustrates an exemplary media content splicer according to principles described herein.

Insertion facility 308 may be configured to insert advertisement content selected by advertisement selection facility 306 into one or more media content streams and/or channels for distribution to access subsystem 106. The advertisement content may be inserted in any suitable way. For example, insertion facility 308 may include a splicer configured to splice media content streams into one or more media content channels. FIG. 4 illustrates an exemplary splicer 400. FIG. 4 illustrates a simple example; splicer 400 typically receives and outputs more input and output streams than shown. In certain embodiments, splicer 400 may be configured to function similar to a switch to select which input stream (or streams) is to be inserted into and/or otherwise selected to become an output stream that is then inserted into a media content channel for distribution by service provider subsystem 104 to access subsystem 106. For example, splicer 400 may receive input media content streams 402 and 404 (or simply "input streams 402 and 404") and may dynamically select which of the input streams 402 and 404 to insert into, or that will otherwise become, a media content output stream 406 (or simply "output stream 406") at any given time. The selected output stream 406 may then be inserted into a media content channel for distribution to access subsystem 106.

To illustrate, input stream 402 may include a media program stream received from media content provider subsystem 102 and input stream 404 may include an advertisement stream received from advertisement selection facility 306. Splicer 400 may select and insert input stream 402 into output stream 406 until an advertisement break within input stream 402 is reached, at which point splicer 400 may switch to select and insert input stream 404 into output stream 406 for the duration of the advertisement break. At the end of the advertisement break, splicer 400 may switch to again select and insert input stream 402 into output stream 406. In this manner, advertisement content carried by input stream 404 may be inserted into output stream 406 during the advertisement break. When input stream 404 has a lower bit rate than input stream 402, the bandwidth used by output stream 406 may decrease during the advertisement break when input stream 404 is selected for insertion into output stream 406.

Insertion facility 308 may be further configured to generate, maintain, and/or receive data from media content distribution subsystem 114 that is representative of tuning information associated with one or more channels by which media content is to be transmitted to access subsystem 306. The tuning information may include frequency information representative of a physical channel by which one or more media content channels is to be transmitted and program identifier information that distinguishes each of the one or more media content channels from one another, as described in more detail further below.

Insertion facility 308 may be configured to distribute the tuning information associated with each of the one or more channel to access subsystem 106. In certain embodiments, the tuning information may be inserted into media content streams as in-band data. As will be described in more detail below, access subsystem 106 may use the tuning information to tune to a selected channel in order to process (e.g., present) media content carried in the channel. Insertion facility 308 may be additionally or alternatively configured to distribute any other data to access subsystem 106 as may serve a particular implementation.

Storage facility 310 may be configured to maintain advertisement data 312 representative of the advertisement content maintained by advertisement management facility 302 and tuning information data 314 representative of the tuning information generated and/or received by insertion facility 308. It will be recognized that storage facility 310 may maintain additional or alternative data as may serve a particular implementation.

Figure 5:
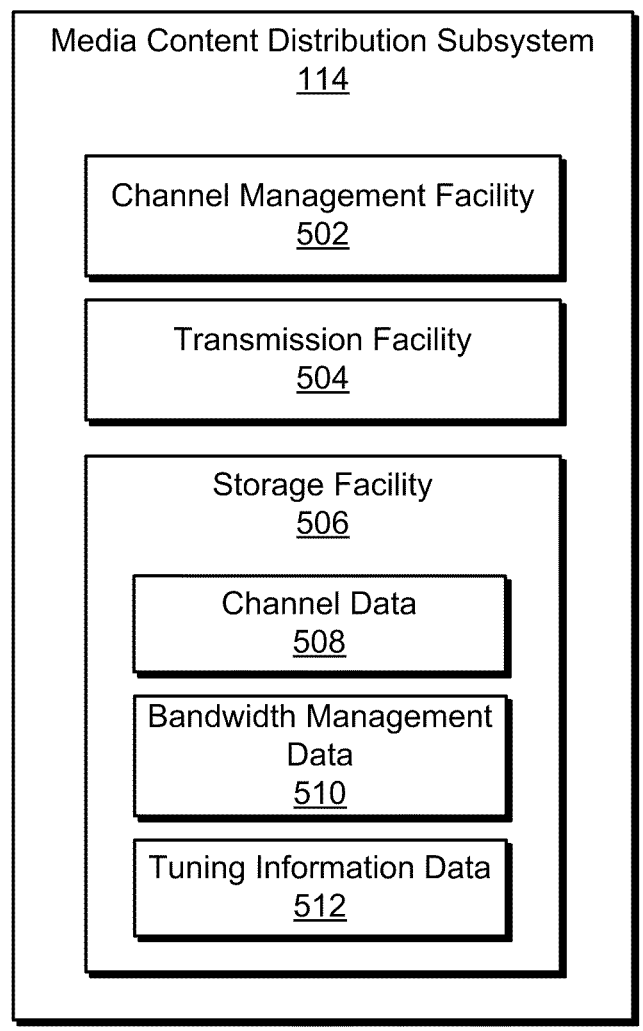
FIG. 5 illustrates exemplary components of a media content distribution subsystem according to principles described herein.

Advertisement insertion subsystem 112 may be configured to provide one or more media content streams (e.g., output stream 406) to media content distribution subsystem 114 for processing and distribution to access subsystem 106. FIG. 5 illustrates exemplary components of media content distribution subsystem 114. As shown, media content distribution subsystem 114 may include a channel management facility 502, a transmission facility 504, and a storage facility 506, which may be in communication with one another using any suitable communication technologies.

Channel management facility 502 may be configured to provide and/or manage one or more media content channels that may be used to delivery media content streams to access subsystem 106. For example, channel management facility 502 may define a media content channel as a digital channel or stream modulated onto a particular frequency band (referred to herein as a "physical channel"). To illustrate, a quadrature amplitude modulation ("QAM") heuristic may be used to modulate a plurality of media content channels (e.g., in the form of a multiplexed transport stream such as a multi-program transport stream ("MPTS")) onto a particular frequency band (e.g., a 6 MHz frequency band), which may be referred to as a QAM channel.

The number of media content channels that may be modulated onto a particular QAM channel may vary based on the resolution and bit rate of media content carried by the channels. For example, in some cases, ten SD channels may be modulated onto a QAM channel while two or three HD channels may be modulated onto another QAM channel. When multiple media content channels are modulated onto a single physical channel (e.g., in the form of a multiplexed transport stream such as an MPTS), each media content channel may be represented by a program identifier (e.g., a program number).

Various types of media content channels may be modulated onto the same QAM channel as may serve a particular implementation. For example, any combination of SD and/or HD channels may be modulated onto the same QAM channel as may serve a particular implementation. It will also be recognized that any other modulation scheme may be used to modulate one or more media content channels onto a physical transport channel as may serve a particular implementation.

Channel management facility 502 may be further configured to dynamically manage bandwidth used to deliver media content streams to access subsystem 106. For example, channel management facility 502 may manage bandwidth associated with each physical channel onto which media content channels are modulated. This may include channel management facility 502 dynamically allocating, reserving, and/or adjusting allocation of bandwidth for the media content channels within a physical channel and/or transport stream (e.g., an MPTS). In some examples, channel management facility 502 may perform bandwidth management operations in conjunction with or at the direction of advertisement insertion subsystem 112.

As an example, channel management facility 502 may be configured to dynamically adjust an allocation of bandwidth between media content channels, such as by increasing or decreasing bandwidth allocated to one or more of the media content channels. For instance, channel management facility 502 may increase bandwidth allocated to one media content channel and decrease bandwidth allocated to another media content channel.

In certain embodiments, channel management facility 502 may be configured to dynamically adjust an allocation of bandwidth based on bit rates of media content streams provided to media content distribution subsystem 114 by advertisement insertion subsystem 112. For example, when output stream 406 carries media program content of input stream 402 at a first bit rate, channel management facility 502 may allocate sufficient bandwidth for the bit rate to a media content channel used to carry output stream 406. When advertisement content carried by input stream 404 is inserted into output stream 406 at an advertisement break within input stream 402 as described above, channel management facility 502 may adjust the bandwidth allocated to the media content channel for output stream 406 based on the bit rate of input stream 404.

In certain embodiments, channel management facility 502 may be configured to manage bandwidth allocation based on a predefined prioritization of media content channels relative to one another. For example, a first media content channel may be defined to have priority over a second media content channel. Based on this relative prioritization of the channels, channel management facility 502 may be permitted to borrow bandwidth from the second media content channel for use by the first media content channel, thereby increasing an allocation of bandwidth to the first media content channel and correspondingly decreasing an allocation of bandwidth to the second media content channel. Accordingly, when the bandwidth demands of the first media content channel increase, bandwidth may be reallocated from the second media content channel to the first media content channel to accommodate the increased bandwidth demand of the first media content channel.

In some examples, channel management facility 502 may be further configured to provide advertisement insertion subsystem 112 with tuning information associated with the one or more channels by which the subset of advertisements are transmitted. The tuning information may include, but is not limited to, frequency information representative of a frequency band of the physical channel by which each of the one or more media content channels is transmitted and program identifier information associated with each of the one or more media content channels. Advertisement insertion subsystem 112 may in turn distribute the tuning information to access subsystem 106 as described above.

Transmission facility 504 may be configured to transmit media content streams to access subsystem 106 by way of one or more media content channels specified by channel management facility 502. The media content streams may be transmitted to access subsystem 106 in any suitable manner as may serve a particular implementation. As mentioned, media content channels carrying the media content streams may be multiplexed into a transport stream, which may be modulated onto a physical channel used to transport the media content streams. As will be described in more detail below, access subsystem 106 may tune to one of the media content channels in order to select and present media content carried by the media content channel to one or more users.

Storage facility 506 may be configured to maintain channel data 508, bandwidth management data 510, and tuning information data 512 utilized by channel management facility 502. It will be recognized that storage facility 506 may be configured to maintain additional or alternative data as may serve a particular implementation.

Figure 6:
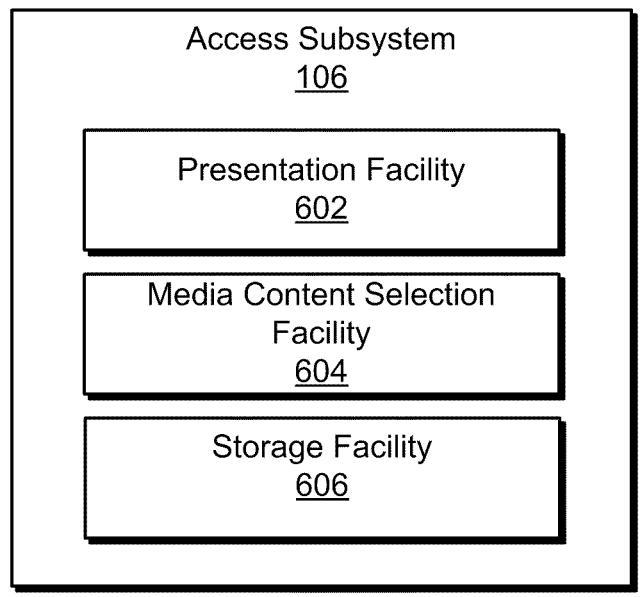
FIG. 6 illustrates exemplary components of an access subsystem according to principles described herein.

FIG. 6 illustrates exemplary components of access subsystem 106. As shown, access subsystem 106 may include a presentation facility 602, a media content selection facility 604, and a storage facility 606, which may be in communication with one another using any suitable communication technologies.

Presentation facility 602 may be configured to control a presentation of media content to a user of access subsystem 106. For example, presentation facility 602 may be configured to display or otherwise present media program content program, advertisement content, and/or any other media content to a user.

Media content selection facility 604 may be configured to dynamically select media content provided by service provider subsystem 104 for presentation to a user. For example, access subsystem 106 may be configured to selectively tune to a media content channel included in the one or more media content channels transmitted by media content distribution subsystem 114 in accordance with tuning information provided by service provider subsystem 104. Presentation facility 602 may then present media content carried by the selected media content channel.

In some examples, media content selection facility 604 may be configured to operate in accordance with a targeted advertisement selection heuristic. For example, media content selection facility 604 may determine, from the advertisement content delivered to access subsystem 160, which advertisement content is most relevant to a user of access subsystem 106 and tune to the media content channel carrying that advertisement content so that the advertisement content may be presented to the user. The determination may be made in accordance with information provided by service provider subsystem 104 to access subsystem 106 describing the contents of advertisement content, a user profile associated with the user, and/or any other information as may serve a particular implementation. Once advertisement content is selected, media content selection facility 604 may direct presentation facility 602 to tune to the media content channel carrying the selected advertisement content in order to present the selected advertisement content to the user.

In certain examples, tuning to a media content channel carrying selected advertisement content may include tuning away from another media content channel carrying less relevant advertisement content. For example, presentation facility 602 may be presenting media content carried by a first media content stream in a first media content channel.

At a start of an advertisement break in the media content stream, media content selection facility 604 may determine that a second media content channel including a second media content stream is carrying advertisement content that is more relevant to a user of access subsystem 106 than the advertisement content contained in the first media content stream during the advertisement break. Accordingly, media content selection facility 604 may tune to the second media content channel such that presentation facility 602 presents the more relevant advertisement content during the advertisement break.

In alternative embodiments, access subsystem 106 may not include a media content selection facility 604 that is capable of selecting advertisement content based on relevance to a user. In such embodiments, presentation facility 602 may continue to stay tuned to the first media content channel such that the advertisement content within the advertisement break of the media content stream in the first media content channel will be presented by presentation facility 602.

Storage facility 606 may be configured to maintain data utilized by presentation facility 602 and/or media content selection facility 604. For example, storage facility 606 may maintain user profile data, media content data, tuning information, and/or any other type of data as may serve a particular implementation.

Figure 7:
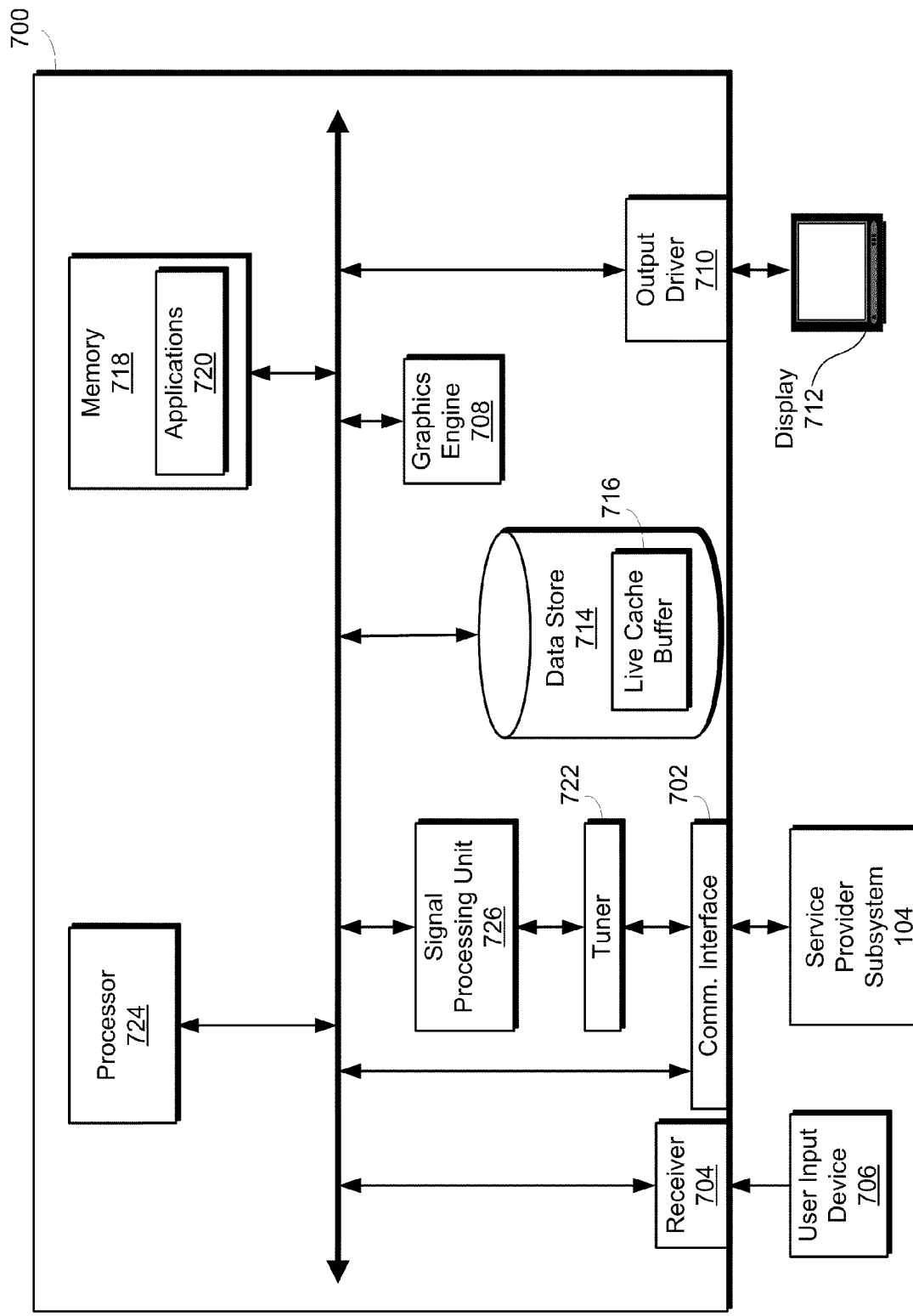
FIG. 7 illustrates an exemplary media content access device according to principles described herein.

Access subsystem 106 and/or components of access subsystem 106 may be implemented as may suit a particular application. FIG. 7 illustrates an exemplary media content access device 700 (or simply "device 700") having access subsystem 106 implemented thereon. Device 700 may include one or more of the components of access subsystem 106 shown in FIG. 7 and may be configured to perform one or more of the processes and/or operations described herein. Device 700 may include, but is not limited to, a set-top-box device, a digital video recorder ("DVR") device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 7, device 700 may include a communication interface 702 configured to receive media content and/or data (e.g., tuning information, metadata, program guide data, and/or any other data associated with media content) in any acceptable format from service provider subsystem 104 or from any other suitable external source. Communication interface 702 may include any device, logic, and/or other technologies suitable for receiving signals and/or data representative of media content and/or other types of media content or data. Communication interface 702 may be configured to interface with any suitable communication media, protocols, and formats, including any of those mentioned above.

Device 700 may include a receiver 704 configured to receive user input signals from a user input device 706. User input device 706 may include, for example, a remote control device or any other suitable input device and may be configured to communicate with receiver 704 via a wireless link, electrical connection, or any other suitable communication link.

Device 700 may include a graphics engine 708 and an output driver 710. Graphics engine 708 may be configured to generate graphics to be provided to output driver 710, which may be configured to interface with or drive a display 712. Output driver 710 may provide output signals to display 712, the output signals including graphical media content (e.g., media content) generated by graphics engine 708 and to be presented by display 712 for experiencing by a user. For example, output driver 710 may provide data representative of a graphical user interface ("GUI") including a program guide view or a media playback view to display 712 for presentation to the user. Graphics engine 708 and output driver 710 may include any combination of hardware, software, and/or firmware as may serve a particular implementation.

Data store 714 may include one or more data storage media, devices, or configurations and may employ any type, form, and combination of storage media. For example, data store 714 may include, but is not limited to, a hard drive, network drive, flash drive, magnetic disc, optical disc, or other non-volatile storage unit. Media content and/or data associated with media content may be temporarily and/or permanently stored in data store 714.

Data store 714 is shown to be included within device 700 in FIG. 7 for illustrative purposes only. It will be understood that data store 714 may additionally or alternatively be located external to device 700.

Data store 714 may include one or more live cache buffers 716. Live cache buffer 716 may additionally or alternatively reside in memory 718 or in a storage device external to device 700. In some examples, media content data may be temporarily stored in live cache buffer 716 to facilitate recording of media content and/or presentation of media content in one or more trick play modes.

Device 700 may include memory 718. Memory 718 may include, but is not limited to, FLASH memory, random access memory ("RAM"), dynamic RAM ("DRAM"), other suitable computer-readable media, or any combination or sub-combination thereof. In some examples, one or more applications 720 configured to run on or otherwise be executed by device 700 may reside in memory 718.

Device 700 may include one or more tuners 722. Tuner 722 may be configured to selectively receive media content carried on a particular media content channel (e.g., a media program content channel and/or an advertisement channel) such that the media content may be processed by device 700. In some examples, media content received by tuner 722 may be temporarily buffered, or stored, in the live cache buffer 716. If there are multiple tuners 722, there may be a live cache buffer 716 corresponding to each of the tuners 722.

While tuner 722 may be used to receive certain media content-carrying signals transmitted by service provider subsystem 104, device 700 may be configured to receive other types of media content signals (including media content signals and/or program guide data signals) from service provider subsystem 104 and/or one or more other sources without using a tuner. For example, service provider subsystem 104 may transmit digital streams of data packets (e.g., Internet Protocol ("IP") based data packets) that can be received without using a tuner. For such types of media content signals, communication interface 702 may receive and forward the signals directly to other components of device 700 (e.g., processor 724 or signal processing unit 726) without the signals going through tuner 722. For an IP-based signal, for example, signal processing unit 726 may function as an IP receiver.

Device 700 may include at least one processor, such as processor 724, configured to control and/or perform one or more operations of device 700. Device 700 may also include a signal processing unit 726 configured to process incoming media content. Signal processing unit 726 may be configured, for example, to demodulate and parse encoded digital media content. In some examples, device 700 may include one or more signal processing units 726 corresponding to each of the tuners 722.

Figure 8:
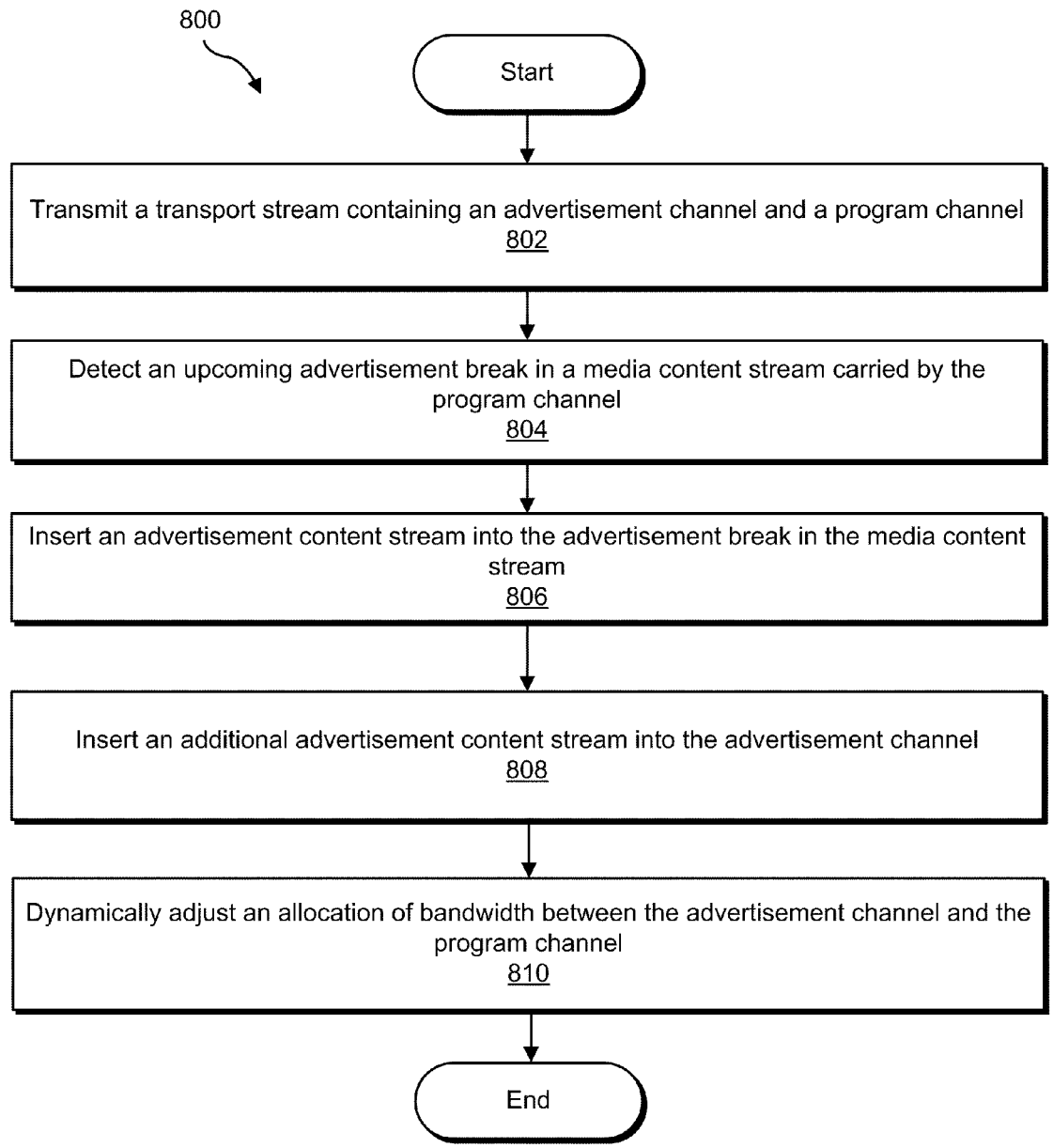
FIG. 8 illustrates an exemplary media content delivery method according to principles described herein.

FIG. 8 illustrates an exemplary media content delivery method 800. While FIG. 8 illustrates exemplary steps according to one embodiment, other embodiments may omit, add to, reorder, combine, and/or modify any of the steps shown in FIG. 8. The steps shown in FIG. 8 may be performed by any component or combination of components of system 100.

Figure 9:
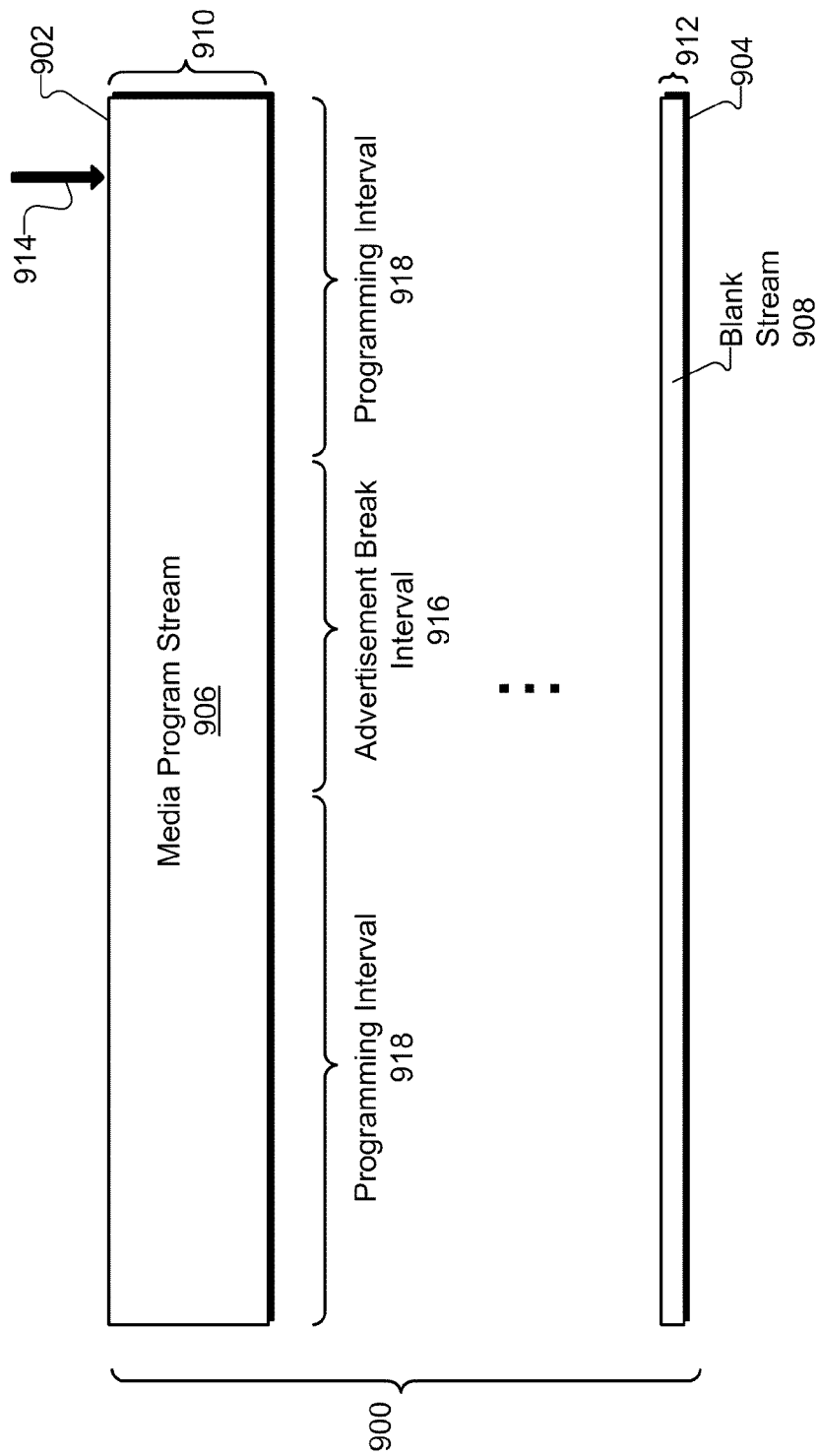
FIGS. 9-11 illustrate a segment of an exemplary transport stream according to principles described herein.

In step 802, a transport stream containing an advertisement channel and a program channel is transmitted. For example, service provider subsystem 104 may transmit a transport stream containing a plurality of media content channels including an advertisement channel and a program channel. To illustrate, FIG. 9 shows an exemplary segment of a transport stream 900 including a plurality of media content channels. As shown, transport stream 900 may include a program channel 902 and an advertisement channel 904. Program channel 902 may carry a media program stream 906, which may include media program content received by service provider subsystem 104 from content provider subsystem 102 as described above. Advertisement channel 904 may carry a blank stream 908 configured to utilize minimal bandwidth (e.g., less than a predetermined amount of bandwidth) of transport stream 900. For example, blank stream 908 may include black video content and muted audio content in order to minimize the bandwidth utilized by blank stream 908.

Transport stream 900 may have an overall finite amount of bandwidth, which may be allocated between the media content streams included therein. The allocation of bandwidth between the media content streams included in transport stream 900 may be variable and dynamically adjusted, as described herein. In FIG. 9, a thickness 910 of program channel 902 represents an amount of bandwidth allocated to program channel 902, and a thickness 912 of advertisement channel 904 represents the amount of bandwidth allocated to advertisement channel 904.

Inasmuch as the allocation of bandwidth between media content channels included in transport stream 900 may be variable and dynamically adjusted, thicknesses 910 and 912 represent amounts of bandwidth allocated to program channel 902 and advertisement channel 904, respectively, at a given time in the transmission of transport stream 900. To illustrate, FIG. 9 shows a transmission marker 914 positioned at a particular point along transport stream 900. As transport stream 900 is transmitted over time in step 802, transmission marker 912 may move from right to left along transport stream 900 in FIG. 9 to represent a current time or point in the transmission of transport stream 900. Thus, thicknesses 910 and 912 represent an allocation of bandwidth between program channel 902 and advertisement channel 904 at a point of transmission represented by transmission marker 914 in FIG. 9.

Media program stream 906 may include an advertisement break. For example, advertisement break interval 916 shown in FIG. 9 represents an interval within media program stream 906 that has been designated as an advertisement break. The advertisement break may be designated in any of the ways described above, including by inclusion of a message indicating the advertisement break in media program stream 906. Intervals included in media program stream 906 that are outside of advertisement break interval 916 are designated as programming intervals 918 in FIG. 9. As shown in FIG. 9, transmission marker 914 indicates that a current transmission point of transport stream 900 is such that transmission marker 914 falls within a programming interval 916. Accordingly, thicknesses 910 and 912 represent an allocation of bandwidth of transport stream 900 between program channel 902 and advertisement channel 904 when transmission marker 914 is within the programming interval 916.

Returning to FIG. 8, in step 804, an upcoming advertisement break in a media content stream carried by the program channel is detected. For example, as a point of transmission represented by transmission marker 914 in FIG. 9 approaches advertisement break interval 916, service provider subsystem 104 may detect the upcoming advertisement break in media program stream 906. The upcoming advertisement break may be detected in any of the ways described above.

Figure 10:
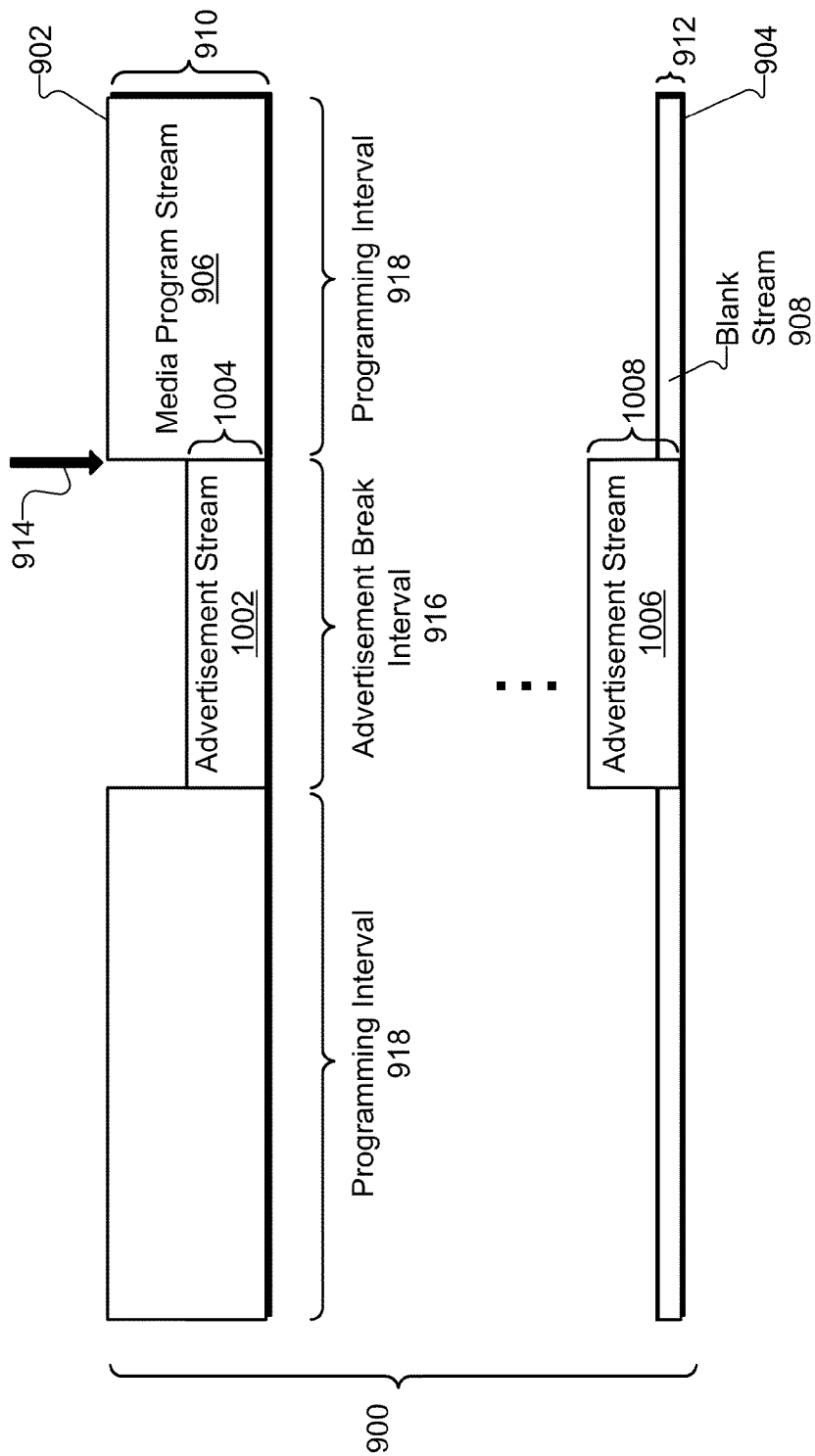

In step 806, which may be performed in response to the detection of the upcoming advertisement break in step 804, an advertisement content stream is inserted into the program channel to temporally coincide with the advertisement break in the media content stream. Step 806 may be performed in any suitable way, including by splicer 400 of FIG. 4 switching away from an input stream 402 such as media program stream 906 to another input stream 404 such as an advertisement content stream at a start of advertisement break interval 916. In this or a similar manner, an advertisement content stream may be inserted in program channel 902 to temporally coincide with advertisement break interval 916. To illustrate, FIG. 10 shows an advertisement content stream 1002 inserted into program channel 902 to temporally coincide with advertisement break interval 916 of media program stream 906 in program channel 902.

As transport stream 900 continues to be transmitted, advertisement content stream 1002 may be transmitted at a bit rate that is lower than the bit rate at which media program stream 906 is transmitted. For example, media program stream 906 may have a first bit rate, and advertisement content stream 1002 may have a second bit rate that is lower than the first bit rate. Accordingly, the insertion of advertisement content stream 1002 into program channel 902 at advertisement break interval 916 may be configured to free bandwidth in transport stream 900 during advertisement break interval 916. Hence, when transmission marker 914 is within advertisement break interval 916, the stream carried by program channel 902 may use less bandwidth than the stream carried by program channel 902 during programming interval 918. This is illustrated in FIG. 10 by a change from thickness 910 to a thickness 1004 of program channel 902 during advertisement break interval 916.

Returning to FIG. 8, in step 808, which may be performed in response to the detection of the upcoming advertisement break in step 804, an additional advertisement content stream is inserted into the advertisement channel. Step 808 may be performed in any suitable way, including by splicer 400 of FIG. 4 inserting media program stream 906 into advertisement channel 904 at a slot that temporally coincides with advertisement break interval 916. To illustrate, FIG. 10 shows an additional advertisement content stream 1006 inserted into advertisement channel 904 at a slot that temporally coincides with advertisement break interval 916 of media program stream 906 of program channel 902.

As transport stream 900 continues to be transmitted, the additional advertisement content stream 1006 may be transmitted at a bit rate that is higher than the bit rate at which blank stream 908 is transmitted. For example, blank stream 906 may have a first bit rate, and the additional advertisement content stream 1006 may have a second bit rate that is higher than the first bit rate. This higher rate transmission may be accomplished by the additional advertisement stream 1006 using at least a portion of the bandwidth of transport stream 900 that is freed up by the insertion of advertisement content stream 1002 into program channel 902 in step 806. The change in the amount of bandwidth used by advertisement channel 904 during the advertisement break interval 916 is represented by a change from thickness 912 to a thickness 1008 of program channel 902 during advertisement break interval 916.

In step 810 of FIG. 8, an allocation of bandwidth between the advertisement channel and the program channel is dynamically adjusted. For example, service provider subsystem 104 may dynamically adjust an allocation of bandwidth between program channel 902 and advertisement channel 904 of transport stream 900. This may include decreasing bandwidth used by program channel 902 and increasing bandwidth used by the advertisement channel 904 at a start of advertisement break interval 916, which may accommodate the insertion of the additional advertisement content stream 1006 in advertisement channel 904.

The dynamic allocation of bandwidth may be performed in any suitable way, including by basing the dynamic allocation on a predefined prioritization of media content channels included in transport stream 900. For example, advertisement channel 904 may be prioritized above program channel 902. Accordingly, when advertisement content stream 1006 is inserted in advertisement channel 904 in step 808, bandwidth may be allocated to advertisement channel 904 to accommodate advertisement content stream 1006. Because program channel 902 has a lower priority than advertisement channel 904, bandwidth allocated to program channel 902 may be reallocated to advertisement channel 904.

As mentioned, during advertisement break interval, access subsystem 106 may receive advertisement stream 1002 and additional advertisement stream 1004 and selectively choose which of the streams 1002 and 1004 to present to a user. As described above, service provider subsystem 104 may provide tuning information data for use by access subsystem 106 to select and present one of the streams 1002 and 1006. Advertisement stream 1006 may be selected by access subsystem 106 staying tuned to program channel 902 during advertisement break interval 916, and additional advertisement stream 1006 may be selected by access subsystem 106 tuning to advertisement channel 904 during advertisement break interval 916.

Figure 11:
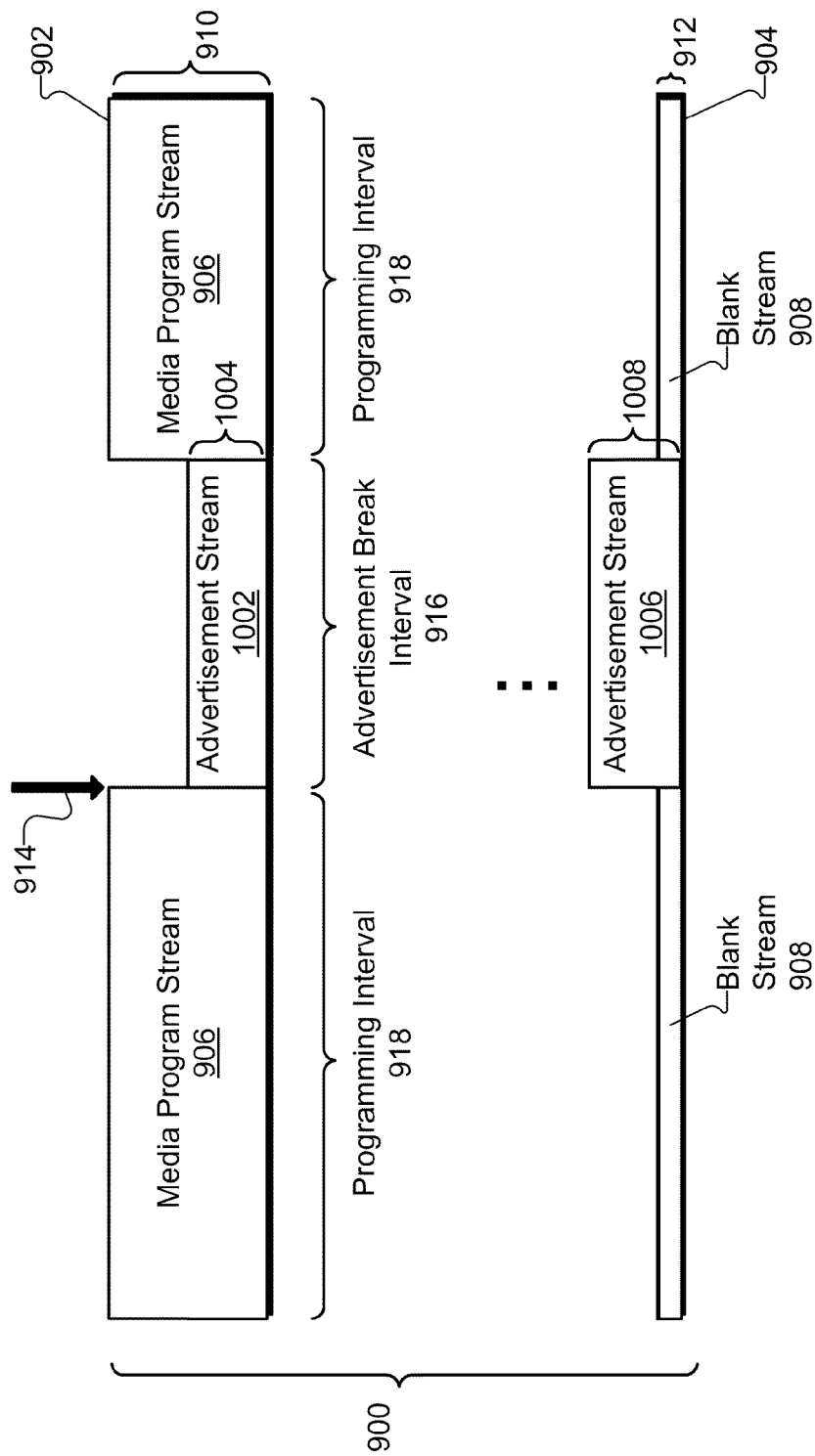

As transmission of transport stream 900 continues at step 802, transmission marker 914 may move to an end of advertisement break interval 916, at which point media content stream 906 may again be inserted in program channel 902 and blank stream 908 may again be inserted in advertisement channel 904 as shown in FIG. 11. These stream insertions may be accommodated by another dynamic allocation of bandwidth between program channel 902 and advertisement channel 904. For example, at the end of advertisement break interval 916, an allocation of bandwidth between program channel 902 and advertisement channel 904 may be dynamically adjusted such as by increasing the bandwidth used by program channel 902 and decreasing the bandwidth used by advertisement channel 904 to accommodate the bit rate of media program stream 906 in program channel 902 and the bit rate of blank stream 908 in advertisement stream 904 after the end of advertisement break interval 916.

Figure 12:
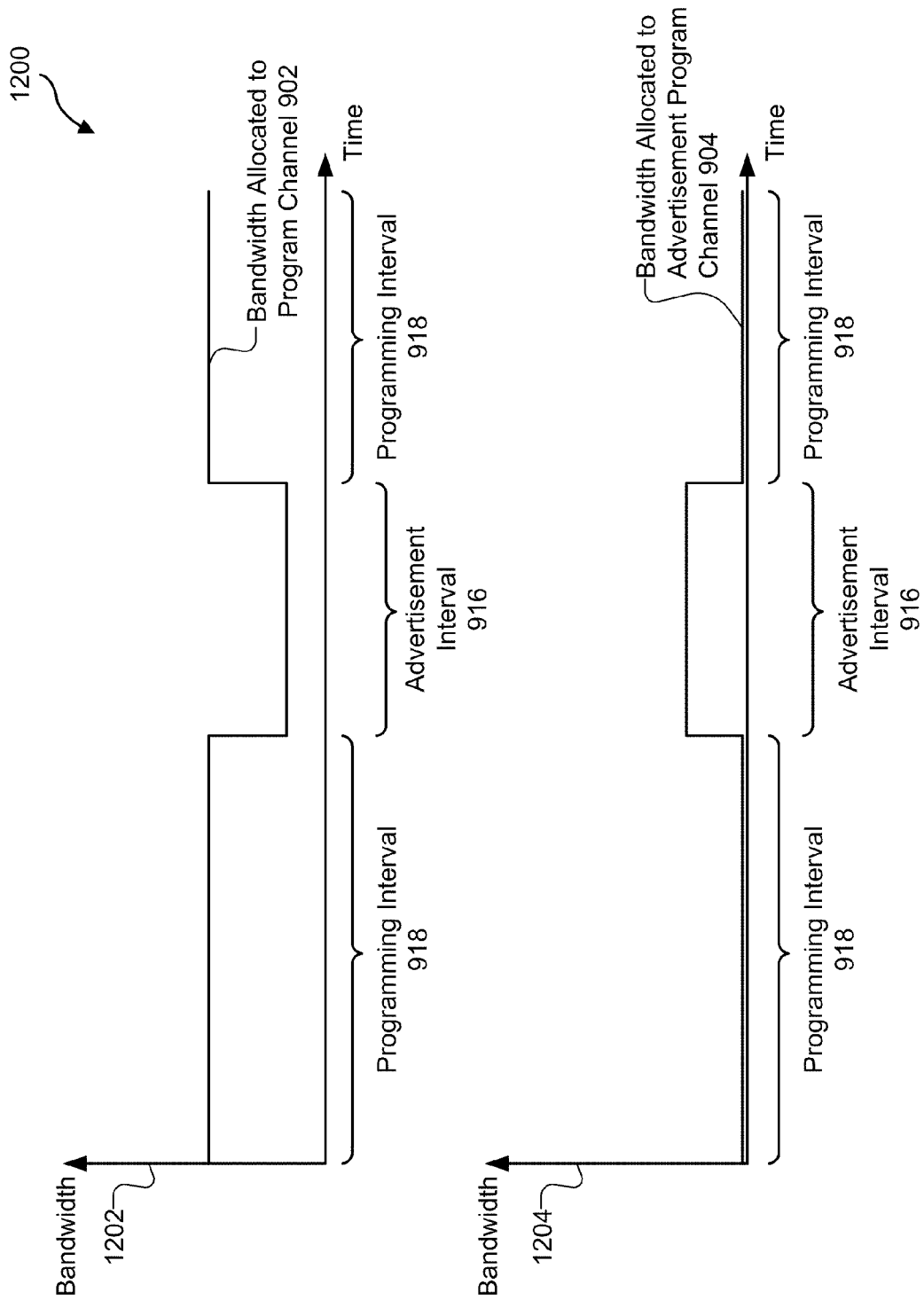
FIG. 12 illustrates an exemplary dynamic allocation of bandwidth between a program channel and an advertisement channel of a transport stream according to principles described herein.

FIG. 12 illustrates an exemplary dynamic allocation 1200 of bandwidth between a program channel and an advertisement channel. In FIG. 12, a first chart 1202 illustrates dynamic adjustments of bandwidth allocated to program channel 902 and a second chart 1204 illustrates dynamic adjustments of bandwidth allocated to advertisement channel 904 over time. As shown, the amount of bandwidth allocated to program channel 902 is dynamically decreased at a start of advertisement interval 916 and dynamically increased at an end of advertisement interval 916. Conversely, the amount of bandwidth allocated to advertisement channel 904 is dynamically increased at a start of advertisement interval 916 and dynamically decreased at an end of advertisement interval 916.

Figure 13:
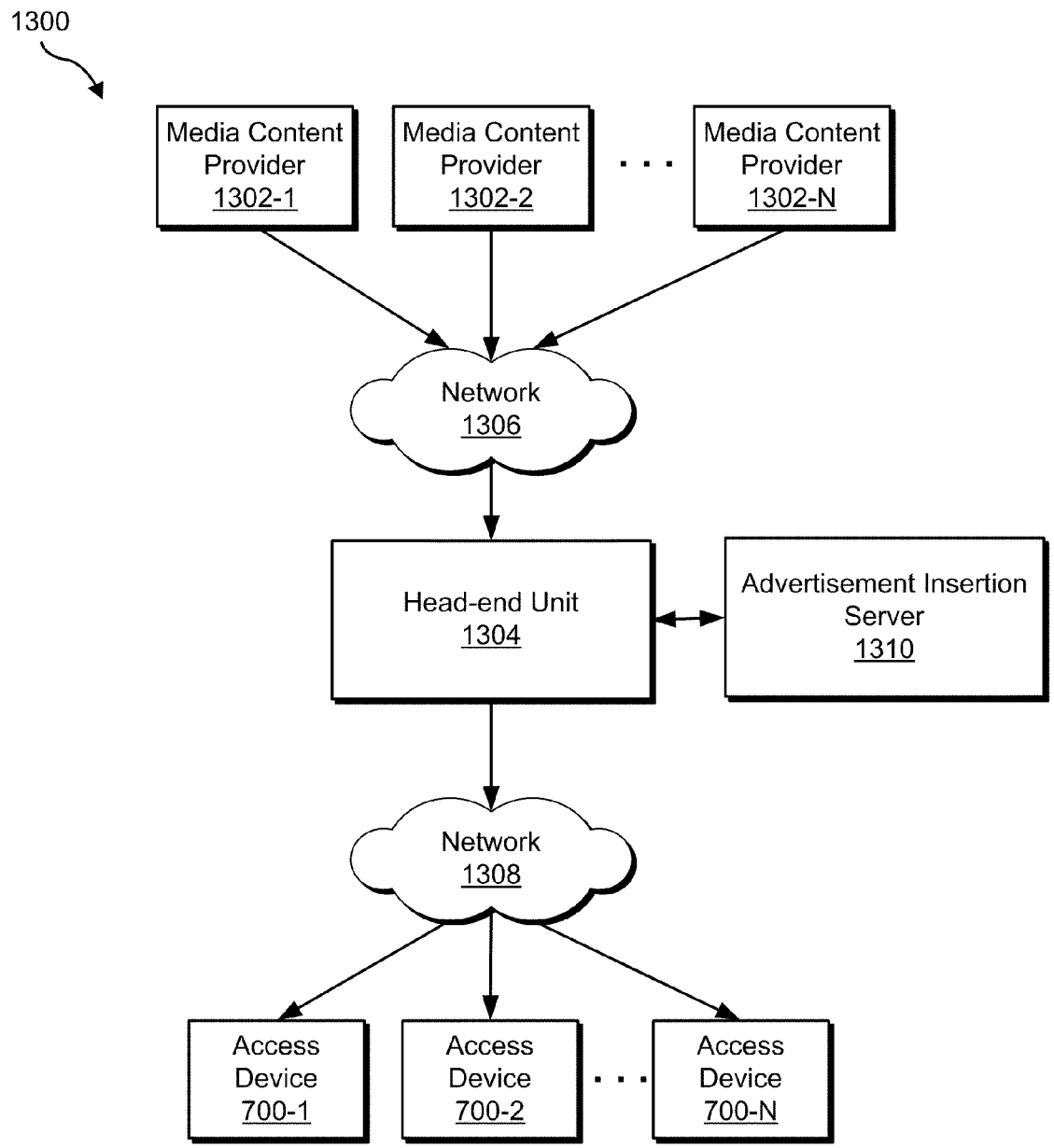
FIG. 13 illustrates an exemplary implementation of the system of FIG. 1 according to principles described herein.

A specific implementation of the systems and methods described herein will now be described in connection with FIG. 13. FIG. 13 illustrates an exemplary configuration 1300 in which media content provider subsystem 102 is implemented by a plurality of media content providers 1302-1 through 1302-N (collectively referred to herein as "media content providers 1302") configured to communicate with a head-end unit 1304 via a network 1306. Head-end unit 1304 may be owned, operated, or otherwise associated with a service provider (e.g., a subscriber television service provider) and may be configured to communicate with a plurality of access devices 700-1 through 700-N (collectively referred to herein as "access devices 700") via a network 1308. Networks 1306 and 1308 may include any of the networks described herein. In some examples, networks 1306 and 1308 comprise a single network.

In some examples, media content providers 1302 may each include one or more components configured to provide one or more media program streams to head-end unit 1304 via network 1306. In some alternative examples, one or more of the media content providers 1302 may be configured to provide one or more media program streams directly to head-end unit 1304 without transmitting data via network 1306.

Head-end unit 1304 may include one or more components configured to acquire media content from media content providers 1302 and distribute the media content to access devices 700 via network 1308. An exemplary head-end unit 1304 may include a video head-end and/or a video hub office configured to acquire and distribute national, regional, and/or local broadcast and/or video-on-demand media content to access devices 700.

In some examples, head-end unit 1304 may be communicatively coupled to an advertisement insertion server 1310. Head-end unit 1304 and advertisement insertion server 1310 may each implement at least a portion of service provider subsystem 104. To illustrate, head-end unit 1304 may detect a message indicative of an upcoming advertisement break in a media content program being transmitted to media content access devices 700 by way of a program channel, communicate with advertisement insertion server 1310 to request advertisement content that may be transmitted to access devices 700 during the advertisement break, receive advertisement content from advertisement insertion server 1310, and insert the advertisement content into one or more media content streams in any of the ways described herein for transmission to access devices 700. Head-end unit 1304 may also distribute tuning information to media content access devices 700, which may each use the tuning information to selectively tune to any of the advertisement content during the advertisement break.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 14:
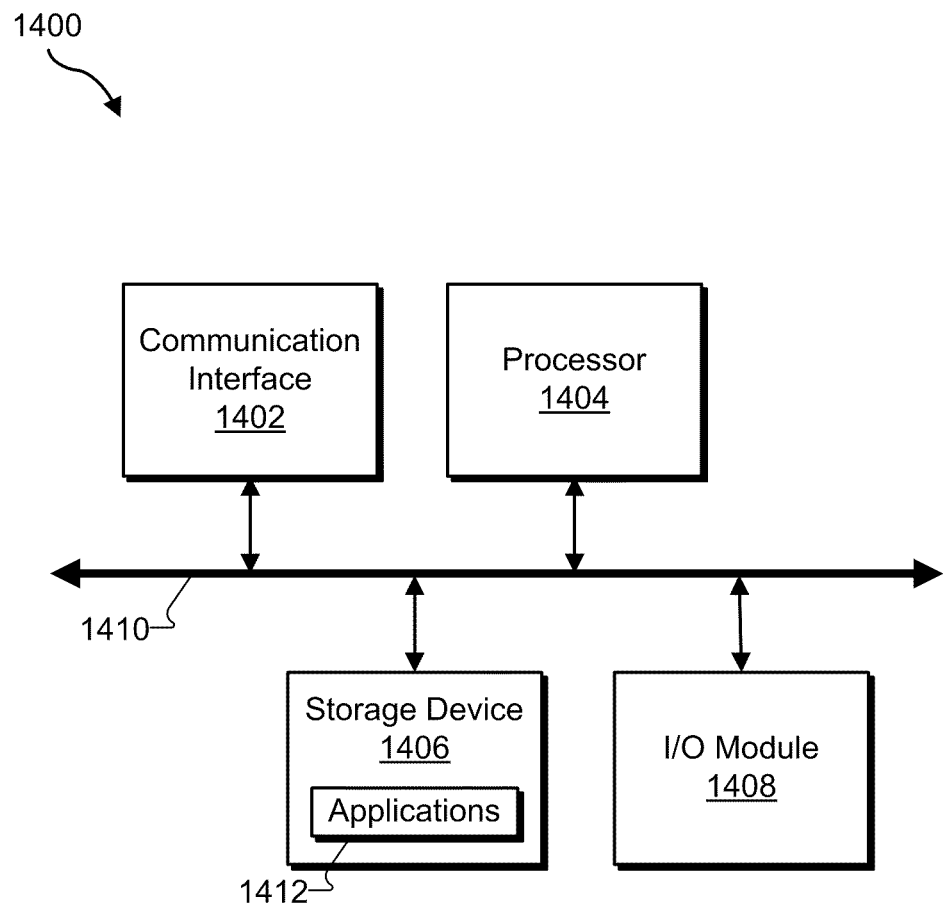
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, and any other suitable interface. Communication interface 1402 may additionally or alternatively provide such a connection through, for example, a local area network (such as an Ethernet network), a personal area network, a telephone or cable network, a satellite data connection, a dedicated URL, or any other suitable connection. Communication interface 1402 may be configured to interface with any suitable communication media, protocols, and formats, including any of those mentioned above.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another non-transitory computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications described herein) configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with media program content facility 202, advertisement break management facility 204, advertisement management facility 302, detection facility 304, advertisement selection facility 306, insertion facility 308, channel management facility 502, transmission facility 504, presentation facility 602, and/or media content selection facility 604. Likewise, storage facilities 206, 310, 506, and/or 606 may be implemented by or within storage device 1406.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
transmitting, by a service provider subsystem, a transport stream containing an advertisement channel and a program channel, the program channel carrying a media program stream at a first bit rate;
detecting, by the service provider subsystem, an upcoming advertisement break within the media program stream;
dynamically adjusting, by the service provider subsystem at a start of the advertisement break, an allocation of bandwidth between the program channel and the advertisement channel by decreasing bandwidth used by the program channel and increasing bandwidth used by the advertisement channel to accommodate inserting multiple advertisement content streams in the transport stream during the advertisement break;
inserting, by the service provider subsystem, an advertisement content stream having a second bit rate that is lower than the first bit rate into the program channel to temporally coincide with the advertisement break; and
inserting, by the service provider subsystem, an additional advertisement content stream in the advertisement channel, the additional advertisement content stream temporally coinciding with the advertisement break and utilizing at least a portion of the increased bandwidth, used by the advertisement channel, that results from the dynamically adjusting of the allocation of bandwidth;
wherein
the advertisement content stream is inserted in the program channel and the additional advertisement content stream is inserted in the advertisement channel such that either the advertisement content stream or the additional advertisement content stream is selectable by a media content access subsystem for presentation to a user during the advertisement break, and
the advertisement channel
carries a blank stream that uses less than a predetermined amount of bandwidth of the transport stream outside of the advertisement break and that does not include advertisement content outside of the advertisement break and any other advertisement break included in the media program stream, and
carries the additional advertisement content stream during the advertisement break, the additional advertisement content stream using more than the predetermined amount of bandwidth during the advertisement break by utilizing the at least the portion of the increased bandwidth, used by the advertisement channel, that results from the dynamically adjusting of the allocation of bandwidth.

2. The method of claim 1, wherein the dynamically adjusting of the allocation of bandwidth at the start of the advertisement break is based on a predefined prioritization of the advertisement channel over the program channel in the transport stream.

3. The method of claim 1, further comprising dynamically adjusting, by the service provider subsystem at an end of the advertisement break, the allocation of bandwidth between the program channel and the advertisement channel by increasing the bandwidth used by the program channel and decreasing the bandwidth used by the advertisement channel to accommodate the first bit rate of the media program stream after the end of the advertisement break.

4. The method of claim 1, further comprising providing, by the service provider subsystem, tuning information data configured for use by the media content access subsystem in receipt of the transport stream to select to either:
stay tuned to the program channel during the advertisement break to select the advertisement content stream for presentation to the user during the advertisement break, or
tune to the advertisement channel during the advertisement break to select the additional advertisement content stream for presentation to the user during the advertisement break.

5. The method of claim 1, further comprising:
receiving, by the media content access subsystem, the transport stream transmitted by the service provider subsystem; and
selecting, by the media content access subsystem, either the advertisement content stream or the additional advertisement content stream for presentation to the user during the advertisement break.

6. The method of claim 5, wherein the selecting comprises the media content access subsystem either:
staying tuned to the program channel during the advertisement break to select the advertisement content stream in the program channel, or
tuning to the advertisement channel during the advertisement break to select the additional advertisement content stream in the advertisement channel.

7. The method of claim 1, wherein:
the transport stream comprises a multi-program transport stream; and
the media program stream carries one of high-definition media program content and standard-definition media program content.

8. The method of claim 1, embodied as computer-executable instructions on at least one non-transitory computer-readable medium.

9. A system comprising:
a media content distribution subsystem that transmits a transport stream containing an advertisement channel and a program channel, the program channel carrying a media program stream at a first bit rate; and
an advertisement insertion subsystem communicatively coupled to the media content distribution subsystem, the advertisement insertion subsystem
detects an upcoming advertisement break within the media program stream,
directs the media content distribution subsystem to dynamically adjust, at a start of the advertisement break, an allocation of bandwidth between the program channel and the advertisement channel by decreasing bandwidth used by the program channel and increasing bandwidth used by the advertisement channel to accommodate inserting multiple advertisement content streams in the transport stream during the advertisement break,
inserts an advertisement content stream having a second bit rate that is lower than the first bit rate into the program channel to temporally coincide with the advertisement break, and
inserts an additional advertisement content stream in the advertisement channel, the additional advertisement content stream temporally coinciding with the advertisement break and utilizing at least a portion of the increased bandwidth, used by the advertisement channel, that results from the dynamic adjustment of the allocation of bandwidth;

wherein the advertisement content stream is inserted in the program channel and the additional advertisement content stream is inserted in the advertisement channel such that either the advertisement content stream or the additional advertisement content stream is selectable by a media content access subsystem for presentation to a user during the advertisement break, and the advertisement channel carries a blank stream that is configured to use less than a predetermined amount of bandwidth of the transport stream outside of the advertisement break and that does not include advertisement content outside of the advertisement break and any other advertisement break included in the media program stream, and carries the additional advertisement content stream during the advertisement break, the additional advertisement content stream using more than the predetermined amount of bandwidth during the advertisement break by utilizing the at least the portion of the increased bandwidth, used by the advertisement channel, that results from the dynamic adjustment of the allocation of bandwidth.

10. The system of claim 9, wherein the dynamic adjustment of the allocation of bandwidth at the start of the advertisement break is based on a predefined prioritization of the advertisement channel over the program channel in the transport stream.

11. The system of claim 9, wherein the media content distribution subsystem further dynamically adjusts, at an end of the advertisement break, the allocation of bandwidth between the program channel and the advertisement channel by increasing the bandwidth used by the program channel and decreasing the bandwidth used by the advertisement channel to accommodate the first bit rate of the media program stream after the end of the advertisement break.

12. The system of claim 9, wherein:

the transport stream comprises a multi-program transport stream; and the media program stream carries one of high-definition media program content and standard-definition media program content.

13. The system of claim 9, wherein at least one of the advertisement content stream and the additional advertisement content stream carries a targeted advertisement.

14. The method of claim 1, wherein the advertisement content stream and the additional advertisement content stream temporally overlap one another during the advertisement break.

15. The method of claim 1, wherein the predetermined amount of bandwidth is less than an amount of bandwidth carried in the program channel outside of the advertisement break.

16. The method of claim 1, wherein the blank stream comprises only black video content and muted audio content outside of the advertisement break and any other advertisement break included in the media program stream.

* * * * *